(12) United States Patent
Frenkel

(10) Patent No.: US 12,455,304 B2
(45) Date of Patent: Oct. 28, 2025

(54) SMART GRID SENSOR WITH POWER HARVESTING FROM LOW LINE CURRENTS

(71) Applicant: MEGGER GRID ANALYTICS LTD, Herzliya (IL)

(72) Inventor: Liron Frenkel, Netanya (IL)

(73) Assignee: MEGGER GRID ANALYTICS LTD, Herzliya (IL)

( * ) Notice: Subject to any disclaimer, the term of this patent is extended or adjusted under 35 U.S.C. 154(b) by 259 days.

(21) Appl. No.: 18/035,761

(22) PCT Filed: Nov. 17, 2021

(86) PCT No.: PCT/IL2021/051372
§ 371 (c)(1),
(2) Date: May 8, 2023

(87) PCT Pub. No.: WO2022/107137
PCT Pub. Date: May 27, 2022

(65) Prior Publication Data
US 2023/0408561 A1   Dec. 21, 2023

Related U.S. Application Data

(60) Provisional application No. 63/114,544, filed on Nov. 17, 2020.

(51) Int. Cl.
*G01R 19/25* (2006.01)
*G01R 15/18* (2006.01)
(Continued)

(52) U.S. Cl.
CPC ....... *G01R 19/2513* (2013.01); *G01R 15/183* (2013.01); *G01R 21/06* (2013.01); *G01R 31/085* (2013.01)

(58) Field of Classification Search
CPC .. G01R 19/2513; G01R 15/183; G01R 21/06; G01R 31/085; G01R 19/2509;
(Continued)

(56) References Cited

U.S. PATENT DOCUMENTS

2014/0160820 A1   6/2014  McKinley
2016/0276954 A1   9/2016  Vos
(Continued)

*Primary Examiner* — Giovanni Astacio-Oquendo
(74) *Attorney, Agent, or Firm* — SOROKER AGMON NORDMAN RIBA

(57) ABSTRACT

A system for harvesting power from AC current in a power line, including a split magnetic core having two halves, wherein the two halves of the magnetic core are configured to enclose around the power line; a coil is wrapped around one or two halves of the magnetic core with a first end and a second end of the coil configured to provide current from the coil; a power harvesting circuit is configured to harvest current from AC current in the power line, the power harvesting circuit including a rectifier and at least one voltage multiplier electrically connected in parallel to the rectifier; and wherein an output of the coil is connected to an input of said power harvesting circuit and an output of the power harvesting circuit is configured to supply voltage and current to load circuits.

3 Claims, 5 Drawing Sheets

(51) Int. Cl.
*G01R 21/06* (2006.01)
*G01R 31/08* (2020.01)

(58) Field of Classification Search
CPC ...... G01R 15/186; H02J 7/345; H02J 50/001; H01F 38/32
USPC .............................................. 324/76.11, 415
See application file for complete search history.

(56) References Cited

U.S. PATENT DOCUMENTS

| | | |
|---|---|---|
| 2017/0047859 A1 | 2/2017 | Sadwick |
| 2017/0199533 A1 | 7/2017 | McCollough |
| 2018/0143234 A1* | 5/2018 | Saxby .................... G01R 31/58 |
| 2019/0057811 A1 | 2/2019 | Gieras et al. |
| 2020/0052488 A1* | 2/2020 | Desmarais .............. H01F 38/28 |
| 2024/0044947 A1* | 2/2024 | Wang ................. G01R 19/0092 |

* cited by examiner

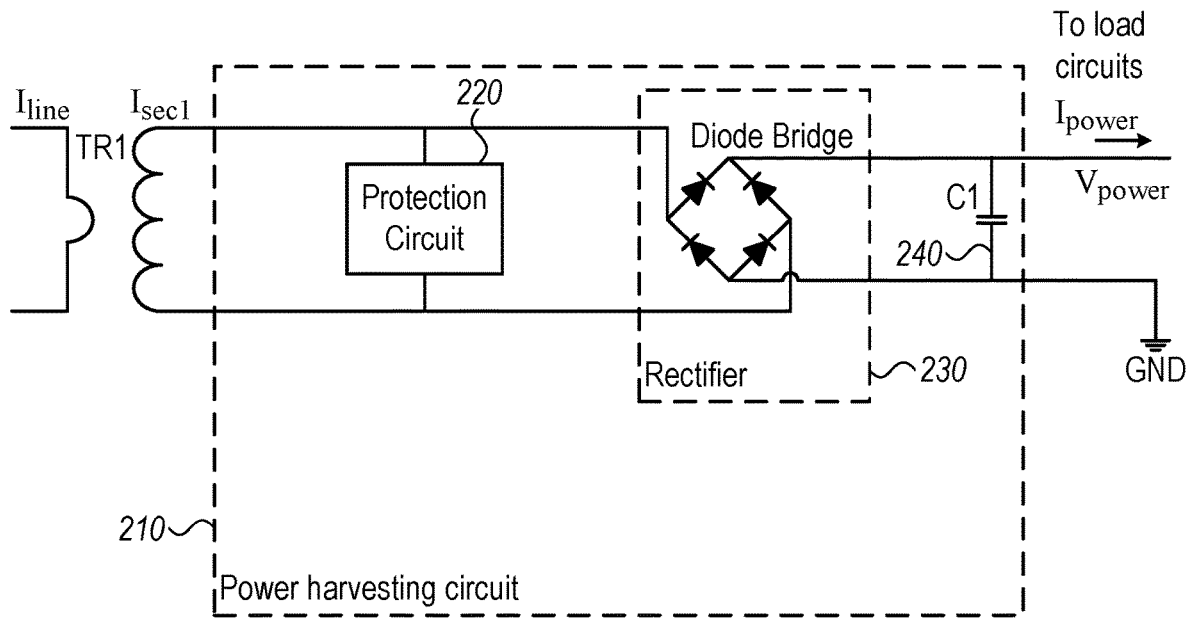
Figure 2 - prior art
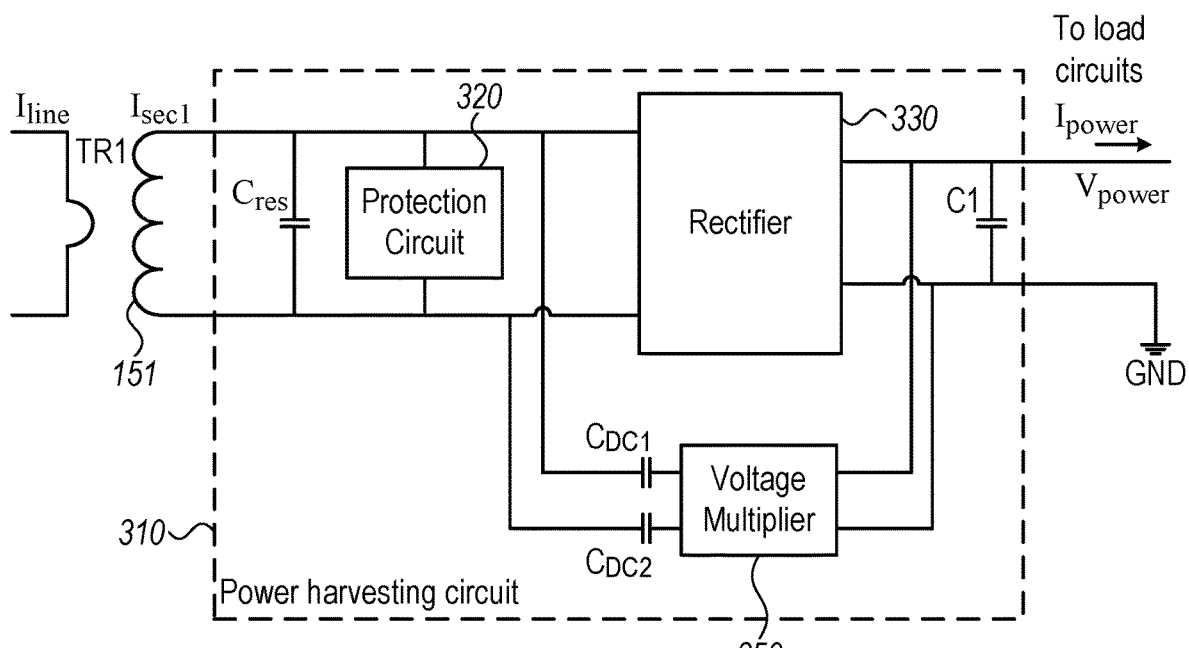
Figure 3

SMART GRID SENSOR WITH POWER HARVESTING FROM LOW LINE CURRENTS

RELATED APPLICATIONS

The present application claims priority from U.S. Provisional application No. 63/114,544 filed on Nov. 17, 2020, the disclosure of which is incorporated herein by reference.

FIELD OF THE INVENTION

The present disclosure relates generally to an overhead line smart-grid-sensor system and more specifically to a system and method for low power operation through power harvesting of low currents in the power line.

BACKGROUND OF THE INVENTION

Smart grid sensors that harvest power from the current passing along the power line typically require significantly high line current to operate. This is a major limitation as it means that the sensors cannot be installed in locations where the power line's current is low. There is thus a need for a system and method that enable low power operation.

SUMMARY OF THE INVENTION

An embodiment of the disclosure relates to a system for harvesting power from AC current in a power line, comprising:
  A split magnetic core comprising two halves, wherein said two halves of the magnetic core are configured to enclose around the power line;
  A coil wrapped around one or two halves of the magnetic core with a first end and a second end of the coil configured to provide current from the coil:
  A power harvesting circuit configured to harvest current from AC current in the power line, comprising:
    A rectifier;
    At least one voltage multiplier electrically connected in parallel to the rectifier; and
    Wherein an output of the coil is connected to an input of said power harvesting circuit and an output of the power harvesting circuit is configured to supply voltage and current to load circuits.

In an embodiment of the disclosure, the system further comprises one or two DC block capacitors located in series to an input of the voltage multiplier. Optionally, the system further comprises a resonance capacitor located in parallel to an output of the coil. In an embodiment of the disclosure, the rectifier of the power harvesting circuit comprises a diode bridge, wherein two inputs of the diode bridge are connected to the first end and second end of the coil, a first output of the diode bridge is connected to an output of the power harvesting circuit, and a second output of the diode bridge is connected to a ground. Optionally, the voltage multiplier comprises a first capacitor electrically connected between the first end of the coil and the output of the power harvesting circuit; and a second capacitor electrically connected between the second end of the coil and a ground. In an embodiment of the disclosure, the system further comprises a power management circuit configured to receive power from the output of the power harvesting circuit and provide current to the load circuits; wherein the power management circuit is configured to function in at least a low power mode operating with low power consumption, and a normal power mode operating with higher power consumption compared to the low mode.

There is further provided according to an embodiment of the disclosure, a system for sensing power in a power line, comprising:
  A current measurement frontend circuit configured to receive current from the power line; wherein the current measurement frontend circuit is configured to provide a low analog channel and a high analog channel responsive to the received current, each of the low and high analog channels having a different gain but a similar time response;
  A multi-channel analog to digital circuit (ADC); wherein a low ADC channel is connected to the low analog channel and a high ADC channel is connected to the high analog channel; and
  A processor configured to select a channel of the multi-channel ADC, receive ADC samples and process the ADC samples;
  Wherein the processor is configured to continuously sample the low ADC channel, check the level of each sample, and switch to the high ADC channel when the level of a sample is at an edge of the ADC range and provide a value of the sample multiplied by a gain ratio between the low and high analog channels.

In an embodiment of the disclosure, the system further comprises a low peak detector connected to an output of the low analog channel; and a high peak detector connected to an output of the high analog channel; wherein the processor is configured to provide a control signal that resets the low and high peak detectors after sampling them; and wherein the processor is configured to measure a battery level of the system and current level in the power line, and when the battery level is low and the current in the line does not supply power for normal operation of the system, the processor instructs the multi-channel ADC to stop directly sampling the low analog channel and the high analog channel, and to begin sampling the output of the low peak detector and the output of the high peak detector, at a lower rate.

In an embodiment of the disclosure, the low peak detector is implemented as a low absolute value integration circuit and the high peak detector is implemented as a high absolute value integration circuit, wherein the absolute value integration circuits comprise:
  A rectifier circuit;
  An integrator circuit with reset capability;
  Wherein the output of the rectifier circuit is connected to an input of the integrator circuit, the reset signal from the processor resets the integrator, and the output of the integrator serves as the peak output.

There is further provided according to an embodiment of the disclosure, a system for sensing power in a power line, comprising:
  A current measurement frontend circuit configured to receive current from the power line and produce a current level output signal;
  A peak detector configured to receive the current level output signal and configured to provide a peak output;
  A multi-channel analog to digital converter (ADC) with a first channel configured to receive the current level output signal and a second channel configured to receive the peak output:
  A processor configured to select a channel from the multi-channel ADC, receiving ADC samples, and processing the ADC samples;
  Wherein the processor is further configured to measure a battery level of the system and a current level in the power line, and when the battery level is low and the current in the line does not supply power for normal operation of the system, the processor instructs the multi-channel ADC to stop sampling the current level signal and to begin sampling the peak detector output, at a lower rate.

In an embodiment of the disclosure, the peak detector is implemented as an absolute value integration circuit, comprising:

A rectifier circuit;
An integrator circuit with reset;
Wherein the output of the rectifier circuit is connected to the input of the integrator circuit, the reset signal fi-om the processor resets the integrator circuit and the output of the integrator circuit serves as the peak output.

There is further provided according to an embodiment of the disclosure, a system for measuring AC current in a power line comprising:

a current measurement frontend circuit configured to measure current in the power line:
an ADC;
a processor for controlling a sampling rate of the ADC:
wherein the processor is configured to sample an output of the ADC, measure a difference $\Delta I(n)$ between a most recent sample $I(n)$ and previous samples, and compare the difference to a predetermined threshold, wherein when $\Delta I(n)$ is larger than a predetermined threshold the processor instructs the ADC to switch to a higher sampling rate relative to a rate it used prior to comparing.

In an embodiment of the disclosure, $\Delta I(n)$ is calculated as the absolute difference between the current sample and the previous sample ($|I(n)-I(n-1)|$). Optionally, $\Delta I(n)$ is calculated as the absolute difference between the current sample minus twice the previous sample and plus the sample before the previous sample ($|I(n)-2*I(n-1)+I(n-2)|$). In an embodiment of the disclosure, $\Delta I(n)$ is calculated as the absolute difference between the current sample and a the N'th previous sample ($|I(n)-I(n-N)|$).

There is further provided according to an embodiment of the disclosure, a system for sensing power in a power line, comprising:

A power storage device to serve as a backup power storage for the system;
A processor and circuit configured to analyze the current sensed in the power line and/or the level of power stored by the power storage device;
A switch configured to connect or disconnect the power storage device from the processor and circuit of the sensor system;
A latch circuit configured to maintain a state of the switch until it is changed by the processor or when an indication of a sufficient amount of available current in the power line is detected;
Wherein the processor senses the power in the power line and the power storage device periodically and when the power is not sufficient to power the processor and circuit the processor closes the switch, which enters an OFF state that is maintained by the latch circuit, and the power storage device is disconnected, when current in the power line rises and charges the processor and circuit, the processor opens the switch automatically, the switch enters an ON state, and the power storage device is reconnected.

In an embodiment of the disclosure, the switch is configured to be toggled by a user between a connected or disconnected state. Optionally, the power storage device is a battery or a super capacitor.

There is further provided according to an embodiment of the disclosure, a method of harvesting power from AC current in a power line, comprising:

Enclosing the power line by combining two halves of a split magnetic core around the power line; wherein a coil is wrapped around one or two halves of the magnetic core, with a first end and a second end of the coil configured to provide current from the coil;
Connecting an input of a power harvesting circuit to the first end and second end of the coil to harvest current from the AC current in the power lines;
Wherein said power harvesting circuit comprises:
A rectifier;
At least one voltage multiplier electrically connected in parallel to the rectifier; and
Wherein an output of the power harvesting circuit is configured to supply voltage and current to load circuits.

In an embodiment of the disclosure, the voltage multiplier comprises a first capacitor electrically connected between the first end of the coil and the output of the power harvesting circuit; and a second capacitor electrically connected between the second end of the coil and a ground.

BRIEF DESCRIPTION OF THE DRAWINGS

Some non-limiting exemplary embodiments or features of the disclosed subject matter are illustrated in the following drawings.

In the drawings:

FIG. 2 is a schematic illustration of a power harvesting circuit as known in the art;

FIG. 3 is a schematic illustration of a power harvesting circuit for performing efficient power harvesting from low currents in a power line, according to an embodiment of the disclosure;

Figure 1:
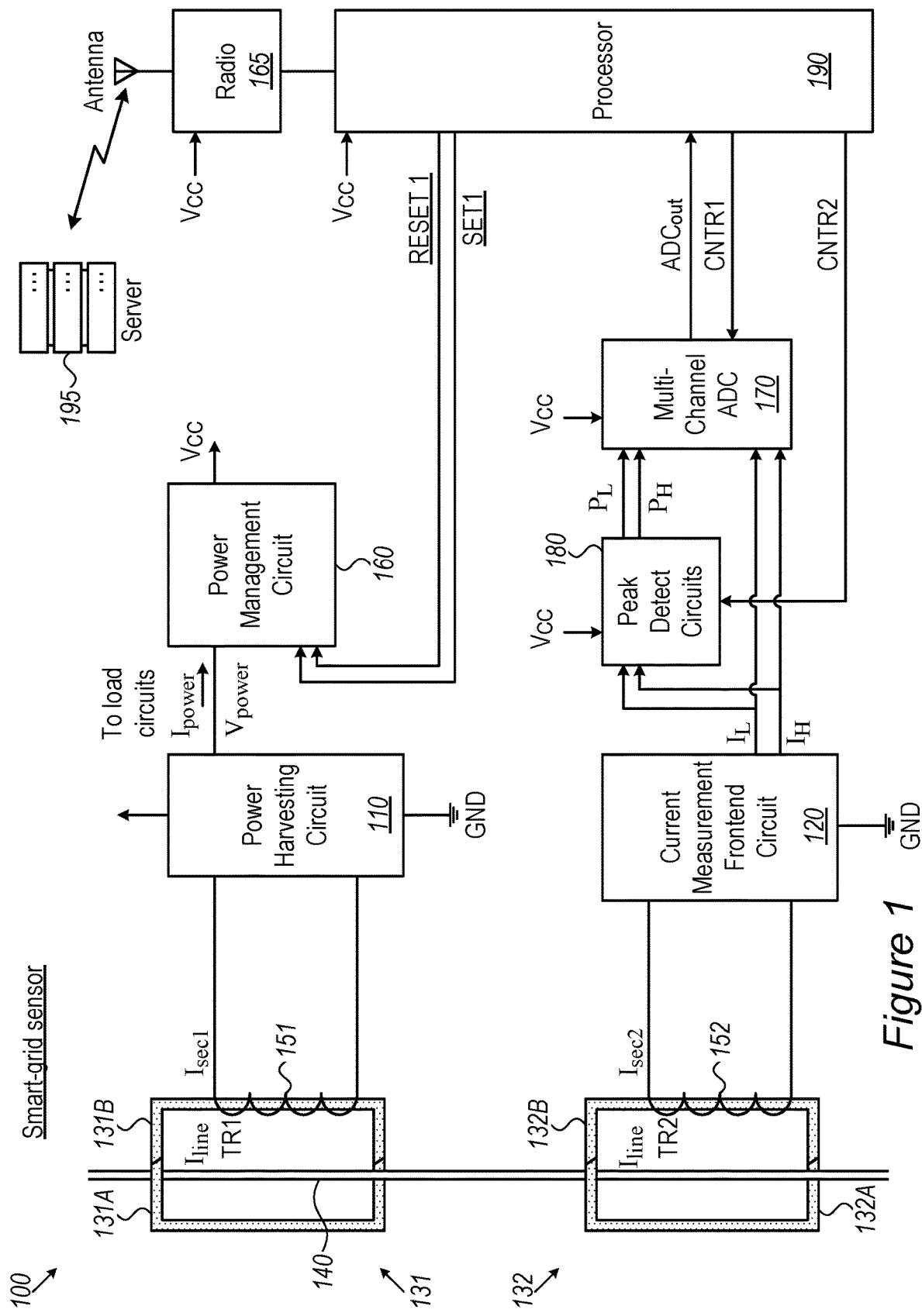
FIG. 1 is a schematic illustration of a top-level hardware block diagram of a smart-grid-sensor, according to an embodiment of the disclosure.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with a different perspective or from a different point of view.

DETAILED DESCRIPTION

According to embodiments of the present disclosure, smart grid sensor systems and methods are provided. Specifically, a system comprising a power harvesting circuit for performing a method of efficient power harvesting from low AC currents in a power line is provided. In addition, a system and method for sampling the current in a power line using dynamic gain adaptation for reduction of current consumption and improvement of the resolution of current sampling is provided. The present disclosure further provides a system and method for implementing a low power mode. The present disclosure provides a method for a dynamic adaptive sampling rate for reducing power consumption, and a method for power shutdown with automatic "wakeup" or returning to "ON" mode, when a power line current is detected.

Reference is now made to FIG. 1, which illustrates a top-level hardware block diagram of the smart grid sensor 100. According to some embodiments, two transformers TR1 and TR2 may be used; TR1 for a power harvesting circuit 110, and TR2 for a current measurement frontend circuit 120. Each of the two transformers TR1 and TR2 may comprise a split magnetic core (131, 132) that includes two half-cores or partial cores (131A, 131B, 132A, 132B). When the sensor 100 is installed on a power line 140, the two halves (131A, 131B, 132A, 132B) of the core (131, 132) of each transformer TR1 and TR2 are closed together to create a closed magnetic loop, and the current of the power line($I_{line}$) 140 may pass through the two closed cores (131, 132) of transformers TR1 and TR2. The secondary winding of transformer TR1 may be a coil 151 which is wrapped around the magnetic core 131 of transformer TR1 and includes multiple turns, with current $I_{sec1}$ passing in the coil's wire. Similarly, the secondary winding of transformer TR2 may be a coil 152 that is wrapped around the magnetic core 132 of transformer TR2 and includes multiple turns with current $I_{sec2}$ passing in the coil's wire.

The Power harvesting circuit 110 illustrated in FIG. 1, may efficiently convert the current $I_{sec1}$ to output voltage $V_{power}$ and output current $I_{power}$, which are fed into a Power management circuit 160 that feeds the power to the line.

The Current Measurement Frontend circuit 120 illustrated in FIG. 1 may convert the current $I_{sec1}$ to two signals. $I_H$ (denoting high current) and $I_L$ (denoting low current), which are sampled by a multi-channel Analog-to-Digital Converter (ADC) 170. In addition, the signals $I_H$ and $I_L$ are also fed to a Peak detection circuit 180 for current measurement in low power mode, and the respective outputs of the Peak detection circuit 180, $P_L$ and $P_H$ are fed to the multi-channel ADC 170. A processor 190 in FIG. 1 resets the Peak detection circuits $P_L$ and $P_H$ via control signal CNTR2 after sampling them. The output of the multi-channel ADC 170 is fed to the processor 190, which controls the ADC 170 and selects the ADCout output channel by the control signal CNTR1. The processor 190 operates by running the appropriate algorithms to control the process, analyze the information, and send the processed information to a server 195 via a radio module 165. Optionally, server 195 uses the information to identify problems in the power lines 140 and dispatch maintenance teams to fix the problems.

The Power management circuit 160 controls supply of the power $V_{cc}$ to the main circuits of the sensor 100 and can shut it down when a power storage device, e.g. a battery, is critically low or when the sensor 100 is in storage (e.g. not deployed).

The power to sensor 100 may return automatically when the sensor 100 is attached onto a power line 140 if the current in the line is high enough. The processor 190 can perform a power shutdown by activating control signal RESET1.

The present disclosure provides methods for low-power operation of smart grid sensors and for efficient power harvesting from AC current in a power line.

Power Harvesting Circuit 110 Performing Efficient Power Harvesting from Low Currents in the Power Line 140

According to an embodiment of the disclosure, a method of efficient power harvesting from low AC currents in a power line 140 is provided, which can efficiently harvest power from different levels of current passing in the power line 140 without requiring to change the turn ratio of transformer TR1, or to use DC to DC conversion methods that consume additional power which reduces the efficiency of the power harvesting, especially when the current in the line is low.

A typical power harvesting circuit 210 known in the art, which comprises a protection circuit 220, diode bridge rectifier 230 and an output capacitor 240, is illustrated in FIG. 2.

FIG. 3 is a schematic illustration of a power harvesting circuit 310 for performing efficient power harvesting from low currents in a power line, according to an embodiment of the disclosure. Power harvesting circuit 310 comprises a Rectifier circuit 330 connected in parallel to a Voltage Multiplier circuit 350. According to some embodiments, the purpose of the Power harvesting circuits (310, 410A, 410B, 510 of FIGS. 3-5) is to produce a maximum output current of the power harvesting circuit $I_{power}$, while maintaining the output voltage $V_{power}$ above a minimum level, which is required for the operation of the other circuits of sensor 100. When the current $I_{line}$ is low, the Voltage Multiplier 350 (FIG. 3) produces higher voltage compared to the Rectifier circuit 330 and can therefore support the minimum required level of $V_{power}$ while the Rectifier circuit 330 is substantially not contributing to the output current. On the other hand, when the current $I_{line}$ is high, the Voltage Multiplier 350 is less efficient compared to the Rectifier, and the Rectifier contributes higher current to the output current $I_{power}$ compared to the Voltage Multiplier. Thus, the combination of the Rectifier circuit 330 and the Voltage Multiplier circuit 350 optimizes the power harvesting both for low and high currents.

In some embodiments of the disclosure, the power harvesting circuit 310 is used in smart grid sensor system 100, including at least two modes of operations, a low power mode in which the sensor consumes low power (e.g., 50 uA-1 mA), and a normal power mode in which the sensor consumes higher current compared to low mode (e.g., 1 mA-30 mA). Accordingly, the voltage multiplier 350 is dominant when the smart grid sensor 100 is operating in low power mode, whereas the rectifier 330 is dominant when the smart grid sensor 100 is operating in normal power mode.

In some embodiments of the disclosure, capacitors $C_{DC1}$ and/or $C_{DC2}$ may be added at the input of the voltage multiplier 350 to provide DC-block functionality. These capacitors may be beneficial especially when the voltage multiplier 350 does not include an input capacitor in series as part of its topology. In some embodiments of the disclosure, multiple voltage multipliers 350 can be used in parallel, where each one of these voltage multipliers has another level of voltage multiplication.

Figure 4A:
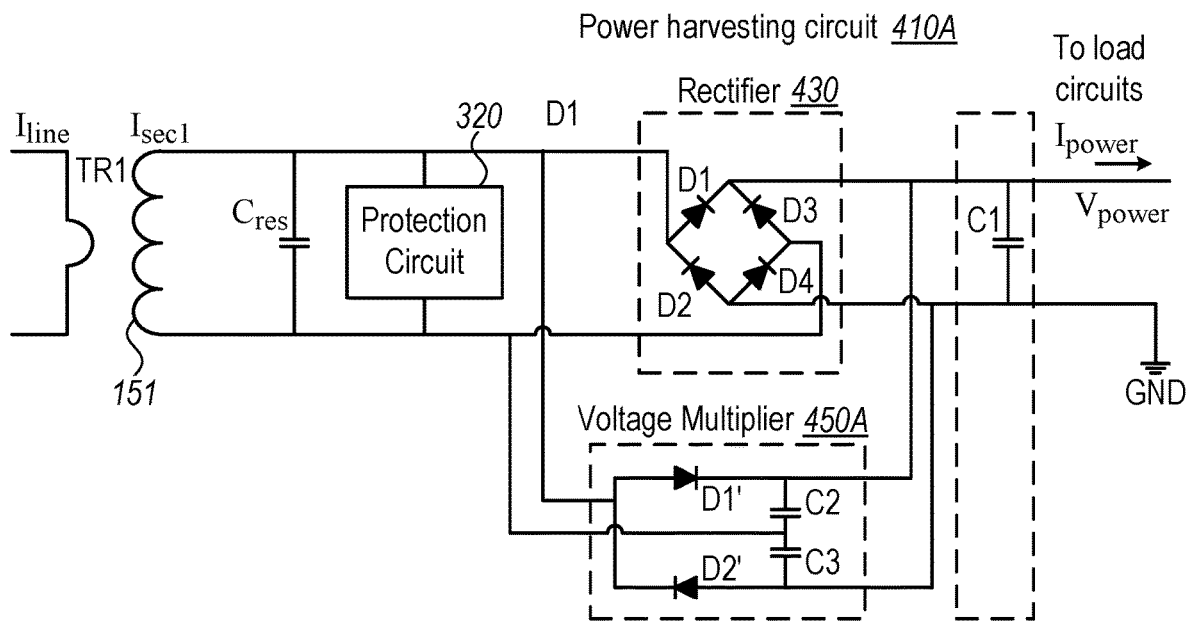
FIGS. 4A-4B are schematic illustrations of examples of a power harvesting circuit for performing efficient power harvesting from low currents in a power line, according to an embodiment of the disclosure.
Figure 4B:
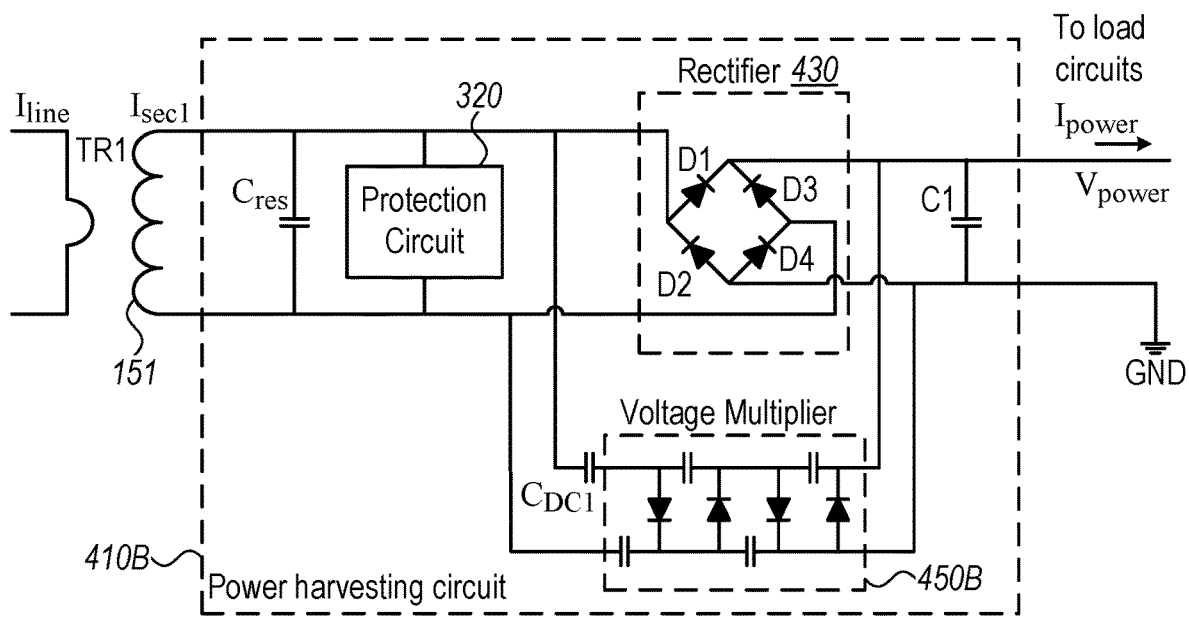

FIGS. 4a and 4b illustrate examples for a specific Rectifier circuit 430, e.g., a diode bridge, and specific Voltage Multiplier circuits (450A, 450B) according to embodiments of the present disclosure.

Figure 5:
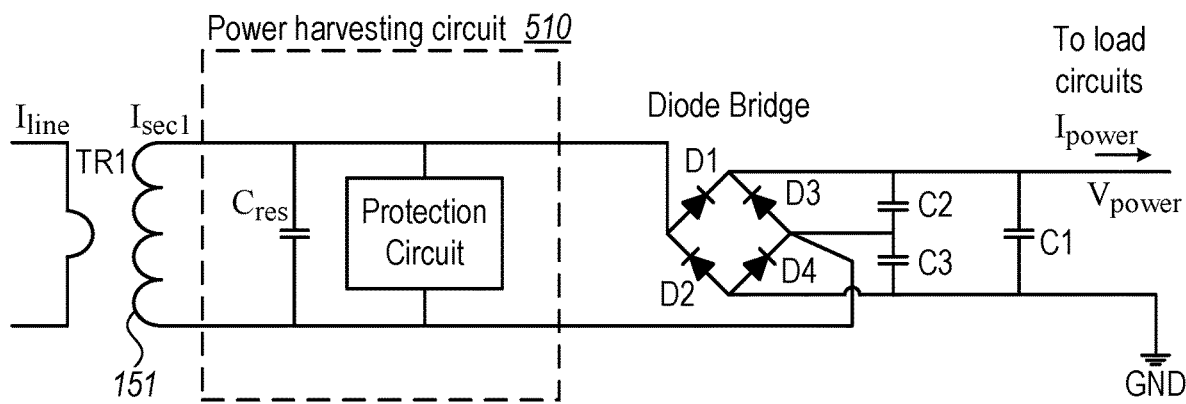
FIG. 5 is a schematic illustration of an equivalent power harvesting circuit for performing efficient power harvesting from low currents in a power line, according to an embodiment of the disclosure.

FIG. 5 illustrates a circuit that is functionally equivalent to the circuit illustrated in FIG. 4a. This figure illustrates an example of a power harvesting circuit 510 for performing efficient power harvesting from low AC currents in a power line, according to embodiments of the present disclosure. According to FIG. 4, diodes D1 and D1' are electrically connected in parallel and therefore can be unified to diode D1 in FIG. 5. Similarly, diodes D2 and D2' in FIG. 4 can also be unified to diode D2 in FIG. 5, for the same reason.

It should be clear that additional or other circuit equivalents may be implemented as part of the system for power harvesting for performing efficient power harvesting from low AC currents in a power line. That is, equivalent circuits may have similar electrical characteristics and similar electrical functionality as circuit 310, which comprises a rectifier 330 and a voltage multiplier 350 in parallel.

According to an embodiment of the present disclosure, a capacitor $C_{res}$ (FIGS. 3-5) is used to increase the power harvesting by creating a resonance with the transformer's inductance. The resonance capacitor $C_{res}$ can be used with the Voltage Multiplier (350, 450A, 450B) or without it, and it may increase the output power of the circuit.

System and Method for Sampling the Current in a Power Line 140 Using Dynamic Gain Adaptation for Reduction of Current Consumption and Improvement of the Resolution of Current Sampling According to an embodiment of the disclosure, two or more analog-channels with output $I_L$ and $I_H$ are constantly operating, while each one of them has a different gain. The two channels ($I_L$ and $I_H$) are fed into multi-channel ADC 170.

The processor 190 (see FIG. 1) is configured to select the ADC-channels according to an algorithm that allows smooth change of dynamic range when the current increases, e.g. due to a fault event in the power grid.

The advantage of a method for sampling the current in a power line 140 using dynamic gain adaptation, according to embodiments of the present disclosure is achieving high sampling resolution when the current in the line, i.e., $I_{line}$, is low, and adjusting the range of the multi-channel ADC to a higher current, e.g., during a fault, without the need to increase the resolution of the multi-channel ADC 170 itself, since increasing the resolution of the multi-channel ADC 170 also increases the power consumption.

Figure 7:
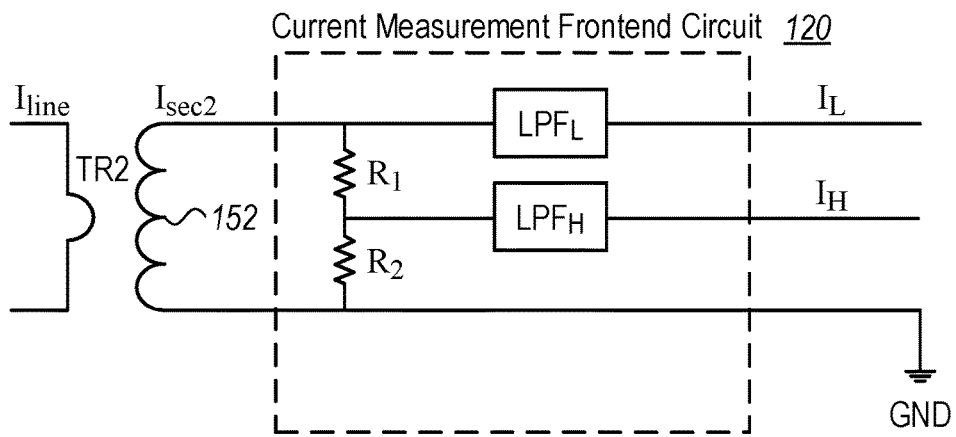
FIG. 7 is a schematic illustration of a current measurement frontend circuit for sampling the current in a power line, according to an embodiment of the disclosure.

FIG. 7 illustrates an exemplary Current Measurement Frontend circuit 120 (FIG. 1), according to an embodiment of the disclosure. The Current Measurement Frontend circuit 120 comprises two analog channels; a "low analog channel" ($LPF_L$) with high gain and an output signal $I_L$, and a "high analog channel" ($LPF_H$) with low gain and an output signal $I_H$. In some embodiments, the output $I_L$ is used when the current in the line, e.g., $I_{line}$, is low, and the output $I_H$ is used when the current in the line $I_{line}$ is high.

According to an embodiment of the present disclosure, $LPF_L$ includes a low pass filter that functions as a anti-aliasing filter, and $LPF_H$ includes a filter with the same frequency and time response. The gain of $LPF_L$ and $LPF_H$ can be different and may be denoted by $G_{LPF\_L}$ and $G_{LPF\_H}$, respectively. The total gain ratio, defined as the total gain of the low analog channel divided by the total gain of the high analog channel is calculated by equation (i):

$$R=[(R1+R2)/R2]*(G_{LPF\_L}/GH_{LPF\_H}). \quad (i)$$

whereby, R is preferably selected to be a power of 2. e.g., R=16.

The multi-channel ADC 170 may constantly sample the output of the low analog channel $I_L$. This sampling state may continue as long as the current in the line $I_{line}$ is lower than the range of the ADC. When a sample of $I_L$ reaches the high or low edge of the range of the ADC, the processor immediately initiates an ADC sample of $I_H$ by a command via control signal CNTR1 illustrated in FIG. 1.

The processor then multiplies the value of the new sample by R, in order to compensate for the different gain between the samples. Following this event, the ADC 170 begins sampling the high channel's output $I_H$ and multiplies each sample by R for a predetermined period, e.g., for a period of one cycle of the mains frequency. While sampling $I_H$, the processor is storing the maximum absolute value of the samples with respect to the center of the full range of the ADC 170 or storing a similar matrix related to the power of the signal. If during the predetermined period, the maximum absolute sample is lower than half of the full range of ADC 170, then the processor switches back to sample $I_L$. If not, the processor begins another period of sampling $I_H$ in a similar way.

According to another embodiment of the disclosure, an air coil (e.g. Rogowski coil) can be used instead of transformer TR2, with suitable current measurement frontend circuits as known in the art, and may use the dual analog channel method of the present disclosure.

According to another embodiment of the disclosure, the change of gain can be done inside the ADC 170 instead of using the two analog channels.

According to yet another embodiment of the disclosure, additional analog channels can be added, and the processor can switch to the next lower-gain analog channel when the level of the current increases and the ADC 170 range of a present analog channel is exceeded.

A Method of Implementation of Low Power Mode

Figure 8:
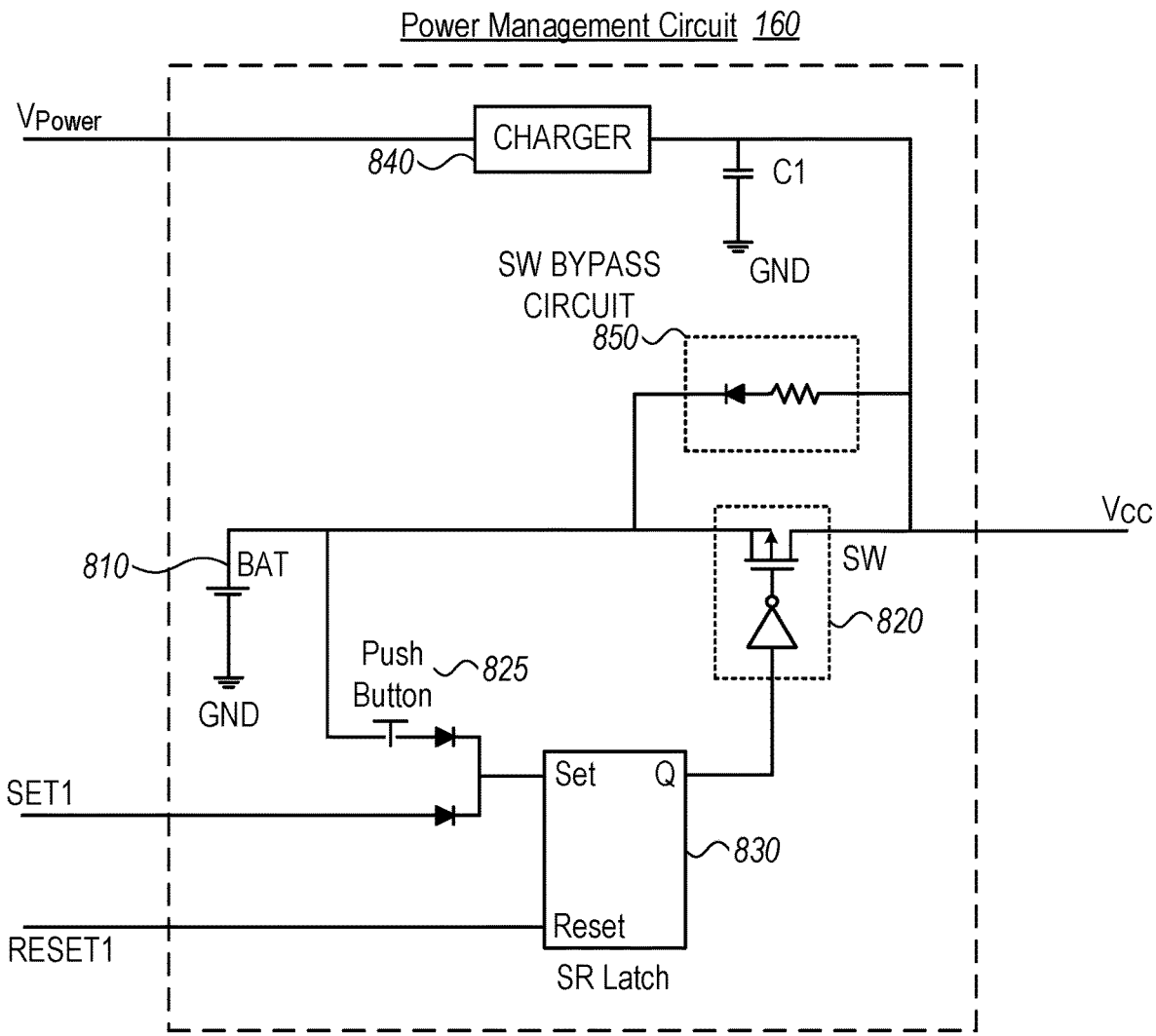
FIG. 8 is a schematic illustration of a power management circuit for power shutdown with automatic "wakeup", according to an embodiment of the disclosure.

According to some embodiments of the present disclosure, the sensor 100 may include Peak Detector circuits 180, which sample the current and voltages. The CPU of the sensor switches the ADC 170 channel from high rate sampling of the currents and voltages to very low rate sampling of the peak detectors using an algorithm that considers the power line's current and a voltage level of a power storage device e.g. battery 810 in the power management circuit 160 (as shown in FIG. 8).

Figure 6:
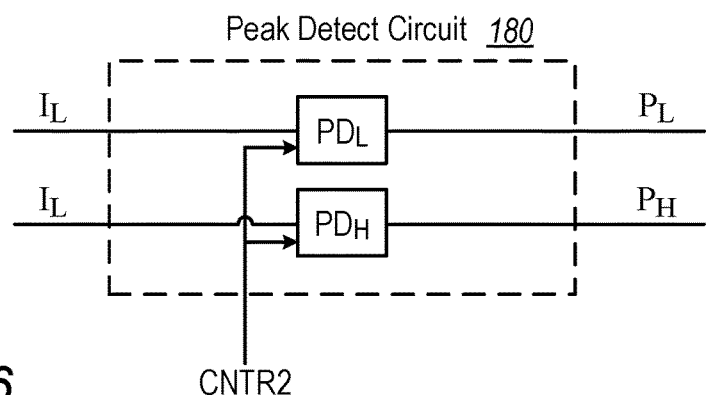
FIG. 6 is a schematic illustration of a peak detecting circuit for implementing low power mode, according to an embodiment of the disclosure.

FIG. 6 illustrates the Peak Detection circuits 180, according to an embodiment of the disclosure. The Peak Detection circuits 180 may comprise two peak detectors $PD_L$ and $PD_H$. The signal CNTR2 from the processor (see also FIG. 1) is configured to reset the peak detectors.

In sonic embodiments of the disclosure, the peak detector circuits 180 may be implemented as absolute value integration circuits, where each absolute value integration circuit may comprise a rectifier circuit followed by an integrator circuit, and thus the output of the peak detector provides the average absolute value of the signal instead of the peak value of the signal. According to this embodiment, the signal CNTL2 from the processor may reset the integrator after sampling it.

When the level of the battery 810 is lower than a predetermined threshold, and in addition the current in the power line 140 is lower than a predetermined threshold, the processor 190 enters low-power mode. In low-power mode the processor 190 stops the fast direct sampling of $I_L$ and $I_H$ and instead the processor samples the peak of the current $P_L$ or $P_H$. The sampling of the peak detectors is performed every cycle of the mains power or every few cycles. After each sample the processor resets the peak detectors using signal CNTR2.

The reduction of the sampling rate reduces the current consumption considerably, since the power consumption of the peak detector circuits themselves can be very low.

The reason for selecting the low or high analog peak ($P_L$ and $P_H$) in low power mode is similar to the reason for selecting $I_L$ and $I_H$ in normal mode. In low power mode the sensor, e.g., sensor 100, can still detect faults and report them to the server 195. According to an embodiment of the present disclosure, the processor 190 switches from low power mode to normal mode immediately when it detects a current jump that is interpreted as a fault event.

sA Method of Dynamic Adaptive Sampling Rate for Reducing Power Consumption

According to some embodiments of the present disclosure, a smart grid sensor, e.g., sensor 100, may sample the current and voltage of the line at a lower rate, and then dynamically switch to a higher sampling rate when the beginning of a potential fault event is detected.

The detection of the beginning of a fault is determined by a current change $\Delta I(n)$ as follows:

(1) Detection of a jump of the current level in the last sample I(n) compared to the previous sample I(n-1):

$$\Delta I(n)=|I(n)-I(n-1)|>\text{Threshold1}$$

(2) Detection of a jump of the current level I(n) compared to the two previous samples:

$$\Delta I(n)=|I(n)-2*I(n-1)+I(n-2)|>\text{Threshold2}$$

(3) Detection of a jump of the current level in the last sample I(n) compared to the current sampled N samples before, where N is the number of samples in a mains power frequency period:

$$\Delta I(n)=|I(n)-I(n-N)|>\text{Threshold3}$$

In another embodiment of the present disclosure, a large change of the sampled electric field can also trigger an increment of the sampling rate using the same principle.

After the processor switches to a high sampling rate, it stays in this mode for a period of time that is required to complete the recording of the complete fault event (e.g. for 10 additional cycles of the mains frequency)

Method of Power Shutdown with Automatic Wakeup when Enough Line Current Detected FIG. 8 illustrates power management circuit 160 according to an embodiment of the disclosure. According to some embodiments of the present disclosure, the sensor's battery 810 can be disconnected completely from all the sensor's circuits or part of them following a command from the processor 190, and can be automatically re-connected when the sensor is installed on a power line without sufficient charging current.

According to an embodiment of the present disclosure, the processor 190 can disconnect the battery when the battery level is critically low and (optionally) when there is not enough current in the line (e.g. when $I_{line}$ is low). In some embodiments, the battery 810 can be disconnected from the processor 190 and/or may also be disconnected from part or all of the main circuits of the sensor According to an embodiment of the disclosure, before the sensor 100 is placed in storage, the user can shut off the power of the sensor 100, e.g., by pressing a pushbutton 825. The processor may sense the user's initiated shut down, e.g., may sense the pressing of a pushbutton 825, wait until it is released, and then the processor activates signal RESET1 (see FIG. 1 and FIG. 8) to disconnect the battery 810. The power may be returned when the user initiates such, e.g., by pressing the pushbutton 825 again or automatically when deploying the sensor 100 when the current in the line ($I_{line}$) is high enough to power the sensor 100.

As shown in FIG. 8, a switch SW 820 may be a bidirectional switch that is ON when its gate is high and OFF when its gate is low. When the switch SW 820 is set to ON mode it connects the battery voltage to the $V_{cc}$ of the circuits of the sensor 100 and the sensor 100 may operate from the battery 810. The components of an SR Latch 830 or a circuit with similar functionality holds the switch SW 820 in its position. If the processor activates signal RESET1 for a short time, the switch SW 820 is set to OFF mode, the SR latch 830 keeps the switch SW 820 in its OFF state, and if the current in the line ($I_{line}$) is low then the voltage to the circuits, including the processor 190 (Vcc), drops down and the sensor 100 is shut off. When $V_{power}$ increases due to the increase in the line's current $I_{line}$, or when a user presses the pushbutton 825, the SR Latch 830 is set, the switch 820 turns to ON mode, the SR Latch 830 keeps it in this state, and the sensor 100 returns to operate.

C1 in FIG. 8 is a large capacitor (or supercapacitor) which is used to store power from the current in the line even when the battery 810 is disconnected. The charger 840 in FIG. 8 receives the voltage $V_{power}$ from the power harvesting circuit 110 and charges the battery 810 and the capacitor C1. The charger 840 can use a standard charging method with a voltage limit and a current limit.

When there is sufficient current in the line, $V_{power}$, capacitor C1 is charged, and the processor 190 is activated even if the battery 810 is disconnected by the switch SW 820. When the processor 190 is active it measures the battery level and possibly also the current in the line ($I_{line}$), and if the battery level is above a predefined minimum threshold or the $I_{line}$ is high enough to power the circuit then the processor 190 sets the switch SW 820 to "ON" by activating the signal SET1 in order to connect the battery 810 to the power management circuit 160.

The "SW bypass circuit" 850 in FIG. 8 includes a diode and resistor or a circuit with similar functionality. The function of the SW bypass circuit 850 is to ensure charging of the battery 810 even when the switch SW 820 is OFF. The resistor's function is to limit the battery charging current when the switch SW 820 is OFF in order not to draw too much current from the charger 840 to the battery 810 and thus provide enough current from the charger 840 to the main circuits of the sensor 100.

The invention claimed is:

1. A system for sensing power in a power line, comprising:
   a power storage device to serve as a backup power storage for the system;
   a processor and circuit configured to analyze the current sensed in the power line and/or the level of power stored by the power storage device;
   a switch configured to connect or disconnect the power storage device from the processor and circuit of the sensor system;

a latch circuit configured to maintain a state of the switch until it is changed by the processor or when an indication of a sufficient amount of available current in the power line is detected;

wherein the processor senses the power in the power line and the power storage device periodically and when the power is not sufficient to power the processor and circuit the processor closes the switch, which enters an OFF state that is maintained by the latch circuit, and the power storage device is disconnected, when current in the power line rises and charges the processor and circuit, the processor opens the switch automatically, the switch enters an ON state, and the power storage device is reconnected.

2. The system of claim 1, wherein the switch is configured to be toggled by a user between a connected or disconnected state.

3. The system of claim 1, wherein said power storage device is a battery or a super capacitor.

* * * * *